United States Patent Office 2,926,118
Patented Feb. 23, 1960

2,926,118

HIGH MOLECULAR WEIGHT SULFOXIDE INSECT REPELLENTS AND METHOD OF REPELLING INSECTS

John E. Mahan, Bartlesville, Okla., assignor to Phillips Petroleum Company, a corporation of Delaware No Drawing. Application August 19, 1957
Serial No. 679,054

26 Claims. (Cl. 167—22)

This invention relates to repelling insects. More particularly, this invention relates to a method for repelling insects from a space, particularly from within a confined space or structure, by applying within said space or to a confining surface or structure or within the confined space thereof a high molecular weight sulfoxide compound, defined herein. In one aspect, this invention relates to insect repellents containing as an essential active ingredient a high molecular weight sulfoxide compound described herein. In another aspect, this invention relates to areas rendered insect repellent by the presence thereon of a high molecular weight sulfoxide compound, described herein.

Insects such as flies and roaches are troublesome pests in homes, restaurants, grocery stores, and the like, and especially in warm climates where out-of-door infestation is present all year. Although insecticides have been developed for destroying these pests, it is very often not only impractical but impossible to effect their complete destruction. Consequently, a repellent which will cause the pests to flee the area where the repellent is disposed is very useful since the annoyance and the destruction of the pests are avoided.

An object of this invention is to provide for repelling insects. Another object of this invention is to provide new methods for repelling insects, especially, flies and roaches, from areas otherwise frequented by them. Another object of this invention is to provide highly effective insect repellent compositions. Another object of this invention is to provide an area free of insect habitation.

Other aspects, objects and several advantages of the invention are apparent from a study of this disclosure and the appended claims.

Although the invention is specifically applicable to repelling insects wherever these may be found, it is particularly useful for repelling insects from within confined spaces or from surfaces.

It has now been discovered that high molecular weight sulfoxide compounds, described hereinafter, are effective agents for repelling insects, such as houseflies, biting flies, cockroaches, and the like, from areas frequented by them when applied to said areas in suitable form, such as solution, dusts, emulsion, or the like.

In accordance with the invention, insect repellents have been provided containing as an essential active ingredient at least one compound having the following structural characteristics.

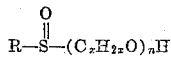

wherein R is a radical selected from the group consisting of alkyl, aryl, alkaryl, aralkyl, and cycloalkyl radicals having from 4 to 16 carbon atoms, $x$ is an integer not less than 2 and ordinarily, though not necessarily, not greater than 5, and $n$ is an integer from 1 to 10.

In accordance with another concept, this invention provides a method for repelling insects from an area or surface by applying to the said area or surface, generally in the absence of the insect, at least one of the above-defined high molecular weight sulfoxide compounds.

In accordance with still another concept, this invention provides areas or surfaces which are insect repellent and which contain deposited thereon at least one of the above-defined high molecular weight sulfoxide compounds.

Also, according to this invention and as a more specific feature thereof, there has been provided a method for repelling insects, especially, for repelling houseflies and roaches, which comprises applying to the place at which said insect may be present an effective quantity of at least one compound selected from the group consisting of the following high molecular weight sulfoxides:

29-hydroxy-3,6,9,12,15,18,21,24,27 - nonaoxanonaeicosyl tert-dodecyl sulfoxide
14-hydroxy-3,6,9,12-tetraoxatetradecyl tert-butyl sulfoxide
5-hydroxy-1,4-dimethyl-3-oxapentyl n-pentyl sulfoxide
8-hydroxy-3,6-dioxaoctyl phenyl sulfoxide
17-hydroxy-3,6,9,12,15-pentaoxaheptadecyl p-tolyl sulfoxide
8-hydroxy-1,4,7-triethyl-3,6-dioxaoctyl cyclohexyl sulfoxide
23-hydroxy-3,6,9,12,15,18,21-heptaoxatricosyl benzyl sulfoxide
2-hydroxyethyl n-hexadecyl sulfoxide
17-hydroxy-3,6,9,12,15-pentaoxaheptadecyl tert-octyl sulfoxide
5-hydroxy-1,4-di-n-propyl-3-oxapentyl sec-butyl sulfoxide
2-hydroxyethyl n-octyl sulfoxide
17-hydroxy-3,6,9,12,15-pentaoxaheptadecyl tert-dodecyl sulfoxide
2-hydroxyethyl tert-nonyl sulfoxide
2-hydroxyethyl tert-dodecyl sulfoxide
8-hydroxy-3,6-dioxaoctyl tert-dodecyl sulfoxide
26-hydroxy-3,6,9,12,15,18,21,24-octaoxahexaeicosyl tert-dodecyl sulfoxide
2-hydroxyethyl n-butyl sulfoxide
2-hydroxyethyl tert-butyl sulfoxide
2-hydroxyethyl tert-octyl sulfoxide
2-hydroxyethyl phenylethyl sulfoxide
11-hydroxy-3,6,9-trioxaundecyl tert-dodecyl sulfoxide
17 - hydroxy - 3,6,9,12,15 - pentaoxaheptadecyl n-dodecyl sulfoxide
8-hydroxy-3,6-dioxaoctyl tert-tetradecyl sulfoxide
20-hydroxy-3,6,9,12,15,18-hexaoxaeicosyl tert-tetradecyl sulfoxide
8-hydroxy-3,6-dioxaoctyl tert-hexadecyl sulfoxide
14-hydroxy-3,6,9,12-tetraoxatetradecyl tert-hexadecyl sulfoxide and
14-hydroxy-3,6,9,12-tetraoxatetradecyl n-hexadecyl sulfoxide Insect repellents of this invention wherein R in the above-disclosed general formula is a hydrocarbon radical, as previously defined, containing from 4 to 14 carbon atoms and $x$ is 2, are preferred repellents. These preferred repellents include the following compounds:

2-hydroxyethyl n-octyl sulfoxide
17-hydroxy-3,6,9,12,15-pentaoxaheptadecyl tert-dodecyl sulfoxide
2-hydroxyethyl tert-nonyl sulfoxide
2-hydroxyethyl tert-dodecyl sulfoxide
8-hydroxy-3,6-dioxaoctyl tert-dodecyl sulfoxide
26-hydroxy-3,6,9,12,15,18,21,24-octaoxahexaeicosyl tert-dodecyl sulfoxide
2-hydroxyethyl n-butyl sulfoxide
11-hydroxy-3,6,9-trioxaundecyl tert-dodecyl sulfoxide and
20-hydroxy-3,6,9,12,15,18-hexaoxaeicosyl tert-tetradecyl sulfoxide Methods of preparing high molecular weight sulfoxide compounds disclosed in this invention are well known to those skilled in the art. As an example of one very suitable method of preparing these compounds, glycol thioethers are oxidized using hydrogen peroxide or per acids, such as peracetic acid, persulfuric acid ($H_2S_2O_8$), perboric acid, and perbenzoic acid, at a temperature in the range of from 32° F. to 122° F. using a mineral acid catalyst, such as sulfuric acid. The glycol thioethers, commonly referred to as mercaptanalkylene oxide condensation products, can be prepared by condensing the two reactants in the presence of an alkaline catalyst, such as an alkali metal hydroxide, an alkaline earth metal hydroxide, carbonate, or alcoholate, or an alkyl substituted ammonium hydroxide, at a temperature in the range of 122°–300° F.

The repellent materials of this invention can be applied for their intended purpose as either the pure compound or in combination with a carrier and inert materials as a solution or emulsion. Ordinarily, the solvents or carriers used are substantially inert with respect to the active repellent ingredient; at least, they have no detrimental effect upon the repellent activity of the repellent materials disclosed herein. Among the carrier materials which are particularly suitable, are acetone, deodorized kerosene, naphthas, isoparaffinic hydrocarbon fractions known as Soltrol, and other liquid hydrocarbons boiling preferably above atmospheric temperature. Preferably, the isoparaffinic hydrocarbon fraction boils in the approximate range of 260°–800° F. and the deodorized kerosene, which consists primarily of aromatic and straight-chain aliphatic hydrocarbons, boils in the approximate range 300°–600° F. The repellent materials of this invention may also be applied in the form of an aqueous emulsion. If desired, the repellent may be emulsified directly with water or it may first be dissolved in a substantially water insoluble solvent, such as one of the afore-mentioned solvents, and the resulting solution emulsified with water. Any suitable emulsifying or wetting agent may be employed, such as, for example, Span 20 (sorbitan monolaurate), Tween 20 (sorbitan monolaurate polyoxyethylene derivative), Triton X100 (alkylated aryl polyether alcohol), and the like.

The repellent materials of this invention can also be utilized for their intended purpose in the solid state as dust, preferably in admixture with a solid carrier substantially inert to the active repellent ingredient. Solid inert carriers, especially suitable, include kieselguhr, and other inert finely-divided solid materials.

The application of the repellents of this invention to an area for repelling insects can be accomplished by spraying, brushing or dusting the area or surface to be treated. The preferred method of application is by spraying a liquid composition on the surface to be treated; however, aerosols are advantageously employed in closed areas. When applying the repellents of this invention in a solvent or carrier, the lower effective limit of the repellent ingredient concentration is about 0.1 weight percent. Similarly, when applying the repellents as dust, the concentration of the active ingredient is preferably within the limits of 1 to 20 weight percent. Generally, it is advantageous to make application of the repellent in a manner so as to deposit from about 1 to 10 grams of the active ingredient on each 100 square feet of surface. However, larger or smaller amounts can be applied, as desired, although it is generally neither economical to employ larger amounts nor efficient, because of short repellency action, to employ smaller amounts. A typical wettable powder-type formulation comprises 25 weight percent of one of the high molecular weight sulfoxide compounds of this invention, 5 weight percent of an emulsifier, such as an alkylated aryl polyether alcohol (Triton X100) and 70 weight percent of a finely-divided attapulgite.

The repellent materials of this invention can be used in admixture with each other when desired.

The repellents of this invention can be employed to repel insects of many types, and particularly advantageous results are obtained in repelling houseflies, *Musca domestic*. These repellents can also be employed in repelling other insects such as mosquitoes, German cockroaches, *Blatella germanica* (Linn.), American cockroaches, *Periplaneta americana* (Linn.), oriental cockroaches, *Blatta orientalis* (Linn.), and the like.

EXAMPLE I

Several high molecular weight sulfoxide compounds within the general formula previously set forth were tested as repellents for houseflies (*Musca domestica*) by the sandwich-bait method described by L. B. Kilgore in Soap, June 1939.

In this procedure, two strips of molasses, each about ¼ inch wide, were painted on a stiff card of 2¼″ x 4¼″ dimensions. Each strip of molasses extended to within about ¼ inch of the ends, and each was located about ¼ inch from either side. The cards were then placed in an oven and maintained at a temperature of 212° F. for four hours. Strips of highly porous lens paper, 1″ x 5″ in dimension, were then dipped in a 1 percent weight solution in acetone of the sulfoxide compound to be tested, and then allowed to dry over a period of two to three hours. These sulfoxide strips were then superimposed on molasses strips and fastened in place by stapling.

The prepared strips, i.e., the sandwich bait, were then placed in cages containing houseflies (*Musca domestica*), over five days old, which had been starved for six hours. The highly porous paper strip containing the impregnated sulfoxide compound was thus exposed to the flies and the loose-fiber construction of the impregnated paper permitted the flies to remove molasses through it. A molasses bait covered with a strip of lens paper impregnated with a non-repellent material becomes black with flies soon after being exposed and the bait is often consumed in five minutes. In conducting these tests, counts of the number of flies feeding on the strip were taken periodically over a period of two hours and forty-five minutes.

The results of the tests of various high molecular weight sulfoxide compounds obtained in the above-described method are tabulated in Table I.

*Table 1*

| $R-\overset{O}{\underset{\|}{S}}-(CH_2-CH_2-O)_nH$ Compound Tested | | Number of Flies Feeding after X Minutes | | | | | | | | |
|---|---|---|---|---|---|---|---|---|---|---|
| R | n | 5 | 15 | 30 | 45 | 60 | 90 | 120 | 150 | 165 |
| n-octyl | 1 | 0 | 0 | 0 | 0 | 0 | 0 | 0 | 0 | 0 |
| tert-dodecyl | 6 | 0 | 1 | 0 | 1 | 0 | 0 | 5 | 8 | 5 |
| tert-nonyl | 1 | 0 | 0 | 0 | 0 | 0 | 0 | 0 | 0 | 0 |
| tert-dodecyl | 1 | 0 | 0 | 0 | 0 | 0 | 0 | 0 | 0 | 0 |
| Do | 3 | 0 | 0 | 0 | 0 | 0 | 0 | 0 | 0 | 0 |
| Do | 9 | 0 | 0 | 0 | 1 | 0 | 0 | 1 | 0 | 1 |

The preceding tests clearly demonstrate the repellency action of the high molecular weight sulfoxide compounds of this invention with respect to houseflies. Thus, the above data show 2-hydroxyethyl n-octyl sulfoxide and 8-hydroxy-3,6-dioxaoctyl tert-dodecyl sulfoxide, for example, to be very effective in repelling houseflies. One skilled in the art using the above data can readily select the sulfoxide for most effective results in a given application.

EXAMPLE II

A number of runs were made in which some of the sulfoxides of the present invention were tested for repellency to the American roach. In these runs, an apparatus was used which was made from three 4" x 4" glass cylinders with U-shaped openings to allow free passage of the roaches to any of the cylinders. The three cylinders with openings coinciding were taped together and placed on a piece of window glass to form a bottom. Filter papers were slipped under each cylinder, and five roaches were introduced into the cylinders in the evening before the test was to start in the morning so as to give them a chance to become accustomed to new quarters. On the day prior to testing, 11 centimeters' diameter filter papers (Whatman No. 40) were dipped in acetone solutions containing 5 percent of the sulfoxide to be tested. At the beginning of the test, the dried, chemically treated papers were substituted for the untreated papers under the outer two cylinders, and a clean untreated paper was placed under the center cylinder. After one hour, readings were taken on the number of roaches on each treated paper and the number on the untreated paper. The roaches were then stirred again to force them to again choose the least objectionable paper. This reading and stirring process was done each hour until six hours had elapsed from the beginning of the test. The following day, two readings were taken, six hours apart. At the end of the test, the results were recorded as the sum of the number of roaches on each treated paper. Since eight readings were taken in all, and five roaches were present during each test, the maximum number which can be reported for a run is 40.

The results of the tests of various high molecular weight sulfoxide compounds obtained in the above-described method are tabulated in Table II.

Table II

| $R-\overset{O}{\underset{\|}{S}}-(CH_2-CH_2-O)_nH$ Compound Tested | | Total Roaches On Chemical |
|---|---|---|
| R | $n$ | |
| n-butyl | 1 | 0 |
| tert-butyl | 1 | 8 |
| n-octyl | 1 | 5 |
| tert-octyl | 1 | 13 |
| phenylethyl | 1 | 7 |
| tert-nonyl | 1 | 5 |
| tert-dodecyl | 1 | 12 |
| Do | 3 | 11 |
| Do | 4 | 0 |
| Do | 6 | 13 |
| n-dodecyl | 6 | 4 |
| tert-tetradecyl | 3 | 5 |
| Do | 7 | 0 |
| tert-hexadecyl | 3 | 5 |
| Do | 5 | 5 |
| n-hexadecyl | 5 | 14 |

The preceding tests clearly demonstrate the repellency action of the high molecular weight sulfoxide compounds of this invention with respect to roaches. Thus, the above data show 2-hydroxyethyl n-butyl sulfoxide, 11-hydroxy-3,6,9-trioxaundecyl tert-dodecyl sulfoxide, and 20-hydroxy-3,6,9,12,15,18-hexaoxaeicosyl tert-tetradecyl sulfoxide to be very effective in repelling roaches.

Reasonable variation and modification are possible within the scope of the foregoing disclosure and the appended claims to the invention, the essence of which is insect repellents containing a high molecular weight sulfoxide compound, as above described, as essential active ingredients; a method employing such repellent materials to render a surface or an area insect repellent; and areas rendered insect repellent by virtue of deposition thereon of a repellent material above described.

I claim:

1. An insect repellent containing as an essential active ingredient at least one compound characterized by a structural formula having the following characteristics

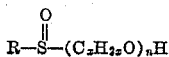

wherein R is a radical selected from the group consisting of alkyl, aryl, alkaryl, aralkyl and cycloalkyl radicals containing from 4 to 16 carbon atoms, $x$ is an integer from 2 to 5, and $n$ is an integer from 1 to 10.

2. An insect repellent according to claim 1 wherein said compound is 2-hydroxyethyl n-octyl sulfoxide.

3. An insect repellent according to claim 1 wherein said compound is 17-hydroxy-3,6,9,12,15-pentaoxaheptadecyl tert-dodecyl sulfoxide.

4. An insect repellent according to claim 1 wherein said compound is 2-hydroxyethyl tert-nonyl sulfoxide.

5. An insect repellent according to claim 1 wherein said compound is 2-hydroxyethyl tert-dodecyl sulfoxide.

6. An insect repellent according to claim 1 wherein said compound is 8-hydroxy-3,6-dioxaoctyl tert-dodecyl sulfoxide.

7. An insect repellent according to claim 1 wherein said compound is 2-hydroxyethyl n-butyl sulfoxide.

8. An insect repellent according to claim 1 wherein said compound is 11-hydroxy-3,6,9-trioxaundecyl tert-dodecyl sulfoxide.

9. An insect repellent according to claim 1 wherein said compound is 20-hydroxy-3,6,9,12,15,18-hexaoxaeicosyl tert-tetradecyl sulfoxide.

10. An insect repellent composition comprising an insect repellent proportion of at least one compound having the following structural characteristcs

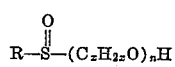

wherein R is a radical selected from the group consisting of alkyl, aryl, alkaryl, aralkyl and cycloalkyl radicals containing from 4 to 16 carbon atoms, $x$ is an integer from 2 to 5, and $n$ is an integer from 1 to 10 dispersed in a hydrocarbon carrier adjuvant.

11. A composition according to claim 10 wherein the carrier adjuvant is deodorized kerosene.

12. An insect repellent composition comprising 25 weight percent of at least one compound having the following structural characteristics

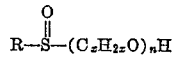

wherein R is a radical selected from the group consisting of alkyl, aryl, alkaryl, aralkyl and cycloalkyl radicals containing from 4 to 16 carbon atoms, $x$ is an integer from 2 to 5, and $n$ is an integer from 1 to 10, 5 weight percent alkylated aryl polyether alcohol, and 70 percent finely-divided attapulgite.

13. A method for repelling an insect from an area comprising applying an effective quantity of a compound of claim 1 to said area.

14. The method of claim 13 wherein said compound is associated with a carrier adjuvant in an amount of at least 0.1 percent by weight.

15. A method of claim 14 wherein said carrier adjuvant is a hydrocarbon solvent.

16. A method of claim 14 wherein said carrier adjuvant is an aqueous emulsion.

17. A method of claim 14 wherein said carrier adjuvant is acetone.

18. A method for rendering a surface insect repellent comprising applying thereto an insect repellent proportion of 2-hydroxyethyl n-octyl sulfoxide.

19. A method for rendering a surface insect repellent comprising applying thereto an insect repellent proportion of 17-hydroxy-3,6,9,12,15-pentaoxaheptadecyl tert-dodecyl sulfoxide.

20. A method for rendering a surface insect repellent comprising applying thereto an insect repellent proportion of 2-hydroxyethyl tert-nonyl sulfoxide.

21. A method for rendering a surface insect repellent comprising applying thereto an insect repellent proportion of 2-hydroxyethyl tert-dodecyl sulfoxide.

22. A method for rendering a surface insect repellent comprising applying thereto an insect repellent proportion of 8-hydroxy-3,6-dioxaoctyl tert-dodecyl sulfoxide.

23. An area surface repellent to insects having deposited thereon an insect repellent proportion of a compound of claim 1.

24. A method for repelling an insect from a confined space which comprises applying within said space an effective quantity of a compound of claim 1.

25. A method for rendering a surface insect repellent comprising applying thereto an insect repellent proportion of 2-hydroxyethyl n-butyl sulfoxide.

26. A method for rendering a surface insect repellent comprising applying thereto an insect repellent proportion of 11-hydroxy-3,6,9-trioxaundecyl tert-dodecyl sulfoxide.

References Cited in the file of this patent

UNITED STATES PATENTS

| 2,140,608 | Ufer | Dec. 20, 1938 |
| 2,570,051 | Eby | Oct. 2, 1951 |

OTHER REFERENCES

King: U.S. Dept. Agr. Handbook No. 69, May 1954, Item No. 4895, p. 167.

Frear: Chem. of Inscet., Fung. and Herb., 2nd ed., D. Van Nostrand, 1948, pp. 108–122.